US012392484B1

(12) United States Patent
Tang

(10) Patent No.: US 12,392,484 B1
(45) Date of Patent: Aug. 19, 2025

(54) DECORATIVE LIGHT STRING

(71) Applicant: GUANGDONG IHOME LIGHTING TECHNOLOGY CO., LTD, Zhongshan (CN)

(72) Inventor: Yuezheng Tang, Zhongshan (CN)

(73) Assignee: GUANGDONG IHOME LIGHTING TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/035,923

(22) Filed: Jan. 24, 2025

(30) Foreign Application Priority Data

Jan. 9, 2025 (CN) ......................... 202520054321.3

(51) Int. Cl.

| | |
|---|---|
| ***F21V 31/00*** | (2006.01) |
| ***F21S 4/10*** | (2016.01) |
| ***F21V 15/01*** | (2006.01) |
| ***F21V 19/00*** | (2006.01) |
| ***F21V 21/08*** | (2006.01) |
| ***F21V 23/00*** | (2015.01) |
| *F21Y 115/10* | (2016.01) |

(52) U.S. Cl.

CPC .............. *F21V 31/005* (2013.01); *F21S 4/10* (2016.01); *F21V 15/01* (2013.01); *F21V 19/003* (2013.01); *F21V 21/0824* (2013.01); *F21V 23/002* (2013.01); *F21Y 2115/10* (2016.08)

(58) Field of Classification Search

CPC ...... F21V 31/005; F21V 15/01; F21V 19/003; F21V 21/0824; F21V 23/002; F21S 4/10; F21Y 2115/10

USPC ..................................................... 362/249.06

See application file for complete search history.

(56) References Cited

U.S. PATENT DOCUMENTS

2023/0146438 A1* 5/2023 Huang .................. F21V 23/007 315/307

* cited by examiner

*Primary Examiner* — James R Greece
*Assistant Examiner* — Hana S Featherly
(74) *Attorney, Agent, or Firm* — Jose Cherson Weissbrot

(57) ABSTRACT

A decorative light string comprises a plurality of lamp bodies and an electric wire connected to the lamp bodies; the lamp body comprises a cover, a bottom plate for sealing an opening of the cover, a circuit board mounted in the cover, and an LED light source mounted on the circuit board; the electric wire is connected to the circuit board and extends out from two sides of the cover; the cover comprises a top wall and a side wall; the top wall is provided with a lens; two sides of the side wall are provided with wire slots; a waterproof step and a first welding rib are arranged on a surface where an end surface of the side wall and the bottom plate are joined; the present invention achieves high waterproof performance, simple structure, easy assembly, high production efficiency, low production cost and high durability.

14 Claims, 5 Drawing Sheets

DECORATIVE LIGHT STRING

TECHNICAL FIELD

This invention generally relates to the technical field of LED lighting fixtures, and more particularly, to a decorative light string.

BACKGROUND

A decorative light string includes a plurality of lamp bodies and an electric wire connecting the plurality of lamp bodies. The lamp body includes a lamp shell and a light source assembly mounted in the lamp shell. The electric wire penetrates through the lamp shell and is connected to the light source assembly. When the decorative light string is used outdoors, a durable and reliable waterproof structure is needed. One of the waterproof structures of the conventional decorative light string is: the light source assembly and the electric wire are first assembled into a whole, and then a lamp shell is integrally formed outside the light source assembly through an injection molding process. Although the aforesaid structure achieves good waterproof effect, due to the pre-embedded parts during the injection molding of the shell, the production efficiency is low and the manufacturing cost is high. The other waterproof structure adopts a split shell, wherein the light source assembly is first mounted in the lamp shell, and after the lamp shell is assembled, a waterproof adhesive is fed into the lamp shell. This structure has high material consuming and poor durability. In addition, the electric wire of the conventional decorative light string adopts a ribbon wire, and the outer surface of the ribbon wire is composed of a plurality of semi-circular arcs. Thus, a matched wire slot in the lamp shell is required, resulting in a complex structure of the wire slot and high difficulty of wire sealing.

SUMMARY

The purpose of the present invention is to provide a decorative light string, which achieves high waterproof performance, simple structure, easy assembly, high production efficiency, low production cost and high durability.

To achieve the above purpose, the present invention adopts the following technical solution: a decorative light string comprises a plurality of lamp bodies and an electric wire connected to the plurality of lamp bodies; the lamp body comprises a cover, a bottom plate for sealing an opening of the cover, a circuit board mounted in the cover, and an LED light source mounted on the circuit board; the electric wire is electrically connected to the circuit board and extends out from two sides of the cover; the cover comprises a top wall and a side wall; the top wall is provided with a lens integrally formed with the cover; two sides of the side wall are provided with wire slots in interference fit with the electric wire; a waterproof step and a first welding rib that are clamped to each other are arranged on a surface where an end surface of the side wall and the bottom plate are joined; the first welding rib is welded and fixed to the waterproof step; the electric wire is a flat shielded wire, and the electric wire extends out from the wire slot; the bottom plate tightly presses the electric wire in the wire slot.

Compared with the prior art, the present invention achieves the following benefits: to achieve high waterproof performance of the lamp body, the cover and the bottom plate are assembled, and the assembly surfaces of the cover and the bottom plate are provided with the first welding rib and the waterproof step that are capable of being welded together; by means of this design, high waterproof performance, simple structure, easy assembly, high production efficiency, low production cost and high durability are achieved; moreover, to achieve high waterproof performance of the electric wire, the flat shielded wire and the wire slot in interference fit with the flat shielded wire are adopted, and the electric wire is fixed in the wire slot by using the bottom plate; because the surface of the wire shield is flat, the structure of the wire slot is simple and high sealing performance is realized.

As a further improvement of the present invention, the waterproof step is arranged on an end surface of the side wall of the cover, the first welding rib is arranged on the bottom plate, and the first welding rib is pressed on the electric wire. The bottom plate is provided with a protruding platform corresponding to the wire slot, and the protruding platform is clamped into the wire slot and pressed on the electric wire. Corners on both sides of the electric wire are configured to be rounded, a bottom wall and a side wall of the wire slot are joined to form a rounded corner corresponding to the electric wire, and two sides of the protruding platform are provided with arc protection edges corresponding to the electric wire. A plurality of first waterproof ribs extending from the bottom wall to the side wall of the wire slot are sequentially arranged in the wire slot from inside to outside. The first waterproof rib on the innermost side is aligned with the first welding rib, second waterproof ribs aligned with the the rest of first waterproof ribs are arranged on the protruding platform, and the first waterproof ribs and the second waterproof ribs are pressed on the electric wire. Two sides of the protruding platform are provided with a second welding rib, and the second welding rib is welded and fixed to the wire slot. The top ends of the first welding rib and the second welding rib are conical structures. A plurality of support plates are erected on the bottom plate, a support rib is arranged on an inner side of the cover, and the circuit board is clamped between the support plates and the support rib. An outer side surface of the support plate abuts against an inner side of the side wall of the cover, so that the waterproof step between the end surface of the side wall and the bottom plate is aligned with the first welding rib. A plurality of positioning ribs are arranged on the inner side of the side wall of the cover, guide inclined surfaces are arranged on the end surfaces of the positioning ribs, and the positioning ribs abut against a side surface of the circuit board, so that the light source on the circuit board is located in the center of the lens. A support rib is arranged on the inner side of the cover, and a support platform is arranged in the center of the inner side of the bottom plate. An outer side of the bottom plate is provided with an inwardly recessed blind hole corresponding to the support platform. The circuit board is clamped between the support plate and the support rib. The decorative light string further comprises a ground inserting portion, and the ground inserting portion comprises an inserting rod. An upper portion of the inserting rod is provided with a connecting portion in interference fit with the blind hole in the bottom plate, and the connecting portion is inserted into the blind hole. A limiting rib is arranged below the connecting portion, and the limiting rib abuts against the outside of the blind hole. The connecting portion is provided with a plurality of grooves extending along its axial direction and a mating rib protruding out from a surface of the connecting portion. The mating rib is in interference fit with the blind hole. A middle portion of the inserting rod is provided with asymmetric anti-slip teeth, a lower portion of the inserting rod is provided with a hook, and a tail portion of the inserting rod is configured to be a tip.

DETAILED DESCRIPTION

Figure 1:
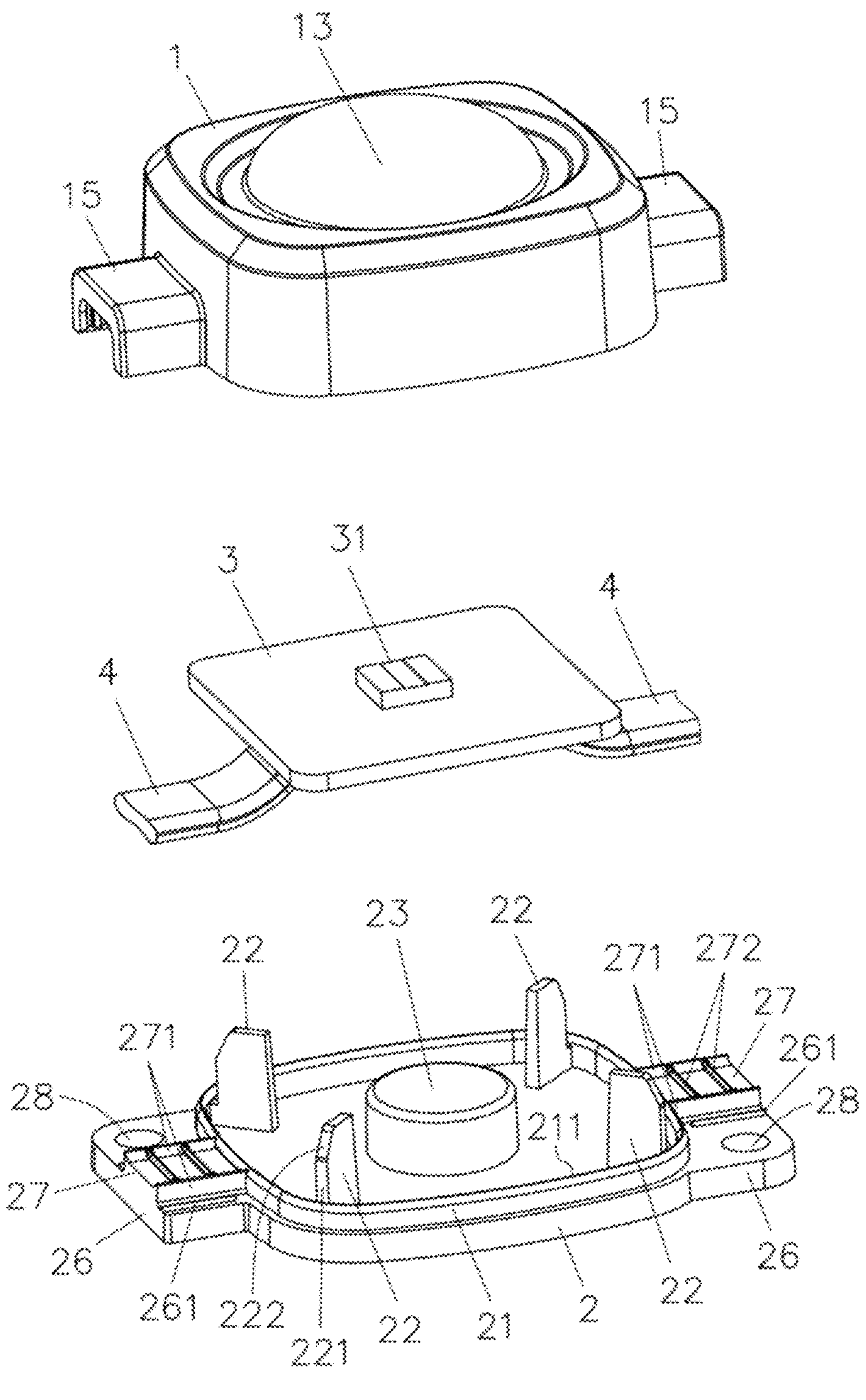
FIG. 1 is a schematic diagram illustrating the assembly of the lamp body.

To allow the features, technical means, purposes and functions of the present invention to be better understood, the following provides a detailed description of the present invention in conjunction with the drawings and specific embodiments. The description of the positional relationship between components themselves and components described in the present invention (including but not limited to upper, lower, inner, outer, left, right, top, and bottom, etc.) is only based on the relative relationship of the relevant components in the positions shown in the drawings and does not indicate an absolute limitation on the scope of the present invention. Those skilled in the art should understand that, when the view orientation of a component changes, the description of the above positional relationship may change, but the essential relationship of its mechanical structure does not change.

Figure 2:
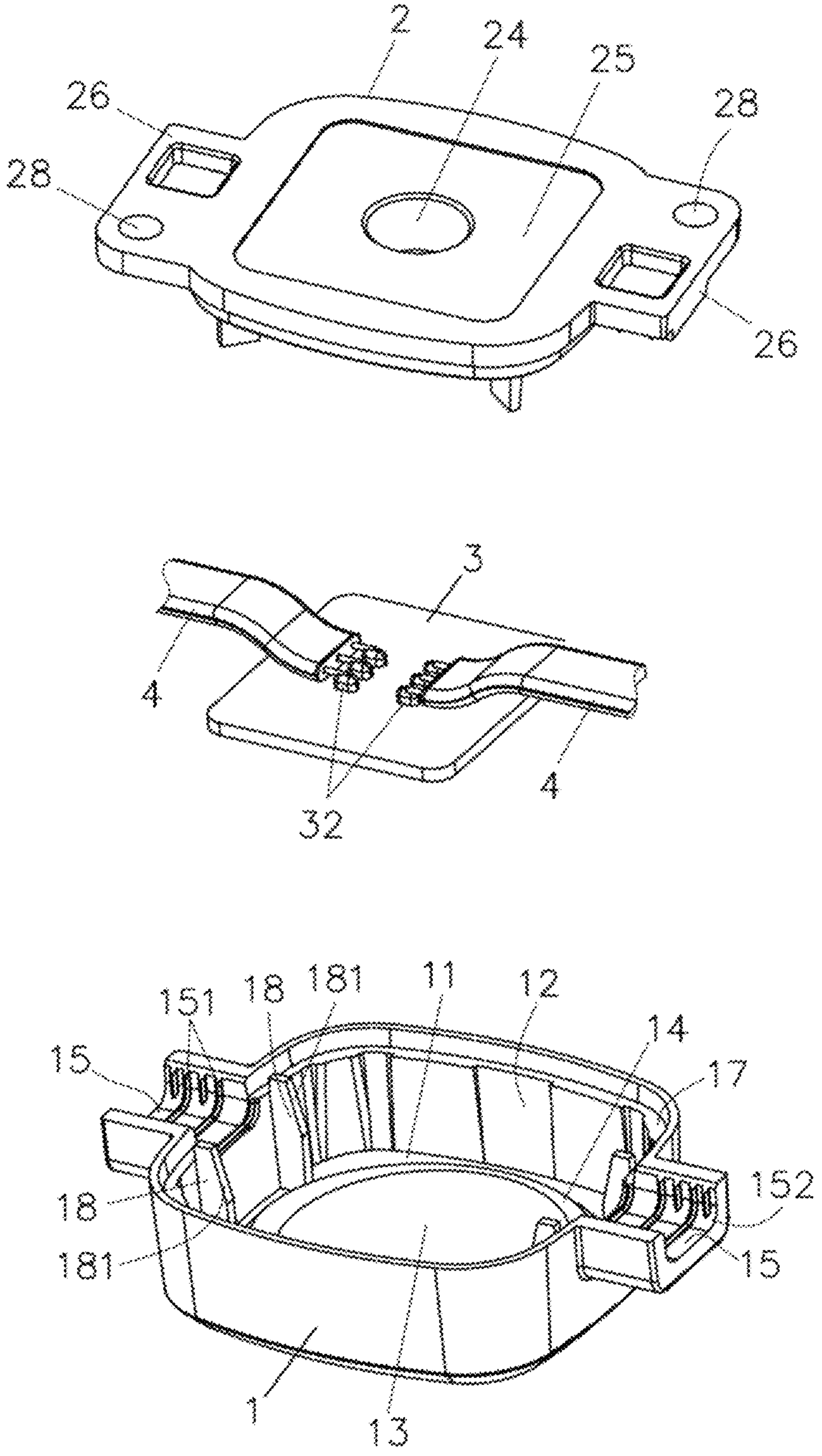
FIG. 2 is another schematic diagram illustrating the assembly of the lamp body.

Referring to FIGS. 1-2, the decorative light string comprises a plurality of lamp bodies, an electric wire 4 connected to the plurality of lamp bodies, and a ground inserting portion 5 for supporting the lamp bodies. The lamp body comprises a cover 1, a bottom plate 2 for sealing an opening of the cover 1, a circuit board 3 mounted in the cover 1, and an LED light source 31 mounted on the circuit board 3. The electric wire 4 is electrically connected to the circuit board 3 and extends out from two ends of the cover 1.

Referring again to FIGS. 1-2, the cover 1 comprises a top wall 11 and a side wall 12 surrounding the top wall 11. The center of the top wall 11 is provided with a lens 13 integrally formed with the cover 1, and an inner side of the top wall 11 is provided with support ribs 14 surrounding the lens 13. The lens 13 and the top wall 11 are integrally formed, thereby achieving high waterproof performance and high mounting convenience. Two sides of the side wall 12 are provided with wire slots 15 protruding out from the side wall 12, and a bottom wall and a side wall of the wire slot 15 are joined to form a rounded corner 152. A plurality of first waterproof ribs 151 extending from the bottom wall to the side wall of the wire slot 15 are sequentially arranged in the wire slot 15 from the inside out, and a waterproof step 17 is arranged on an end surface of the side wall 12 of the cover. A plurality of positioning ribs 18 are arranged on an inner side of the side wall 12, and a guide slope 181 is arranged at a top end of the positioning rib 18. The guide slope is used for guiding the circuit board 3 into an area defined by the positioning ribs 18, so that the LED light source 31 on the circuit board 3 is located in the center of the lens 13.

Referring again to FIGS. 1-2, an annular first welding rib 21 for interacting with the waterproof step 17 of the cover 1 is arranged on an inner side of the bottom plate 2. A top end of the first welding rib 21 is configured to be a conical structure 211, namely, the width of the top end being smaller than the width of the bottom end. The aforesaid arrangement not only ensures that the top end of the first welding rib 21 is fully welded with the waterproof step 17 of the cover during the process, but also ensures that the bottom end of the first melting rib 21 is clamped with the waterproof step 17 to achieve sufficient strength. Four support plates 22 are erected in an area surrounded by the first welding rib 21 on the inner side of the bottom plate 2, and an outer side surface 221 of the support plate 22 interacts with the inner side of the side wall 12 of the cover, so that the first welding rib 21 is aligned with the waterproof step 17 on the cover 1. An end portion of the support plate 22 is provided with a guide inclined surface 222, and the guide inclined surface 222 allows the bottom plate 2 and the cover 1 to be conveniently assembled. The center of the inner side of the bottom plate 2 is provided with a support platform 23, an outer side of the bottom plate 2 where the support platform 23 is located is provided with an inwardly recessed blind hole 24, and the blind hole 24 facilitates the connection to the ground inserting portion 5. A magnetic block 25 is attached to the outer side of the bottom plate 2 around the periphery of the blind hole 24, and the magnetic block 25 allows the lamp body to be attracted to a magnetic metal such as iron. A hanging lug 26 is arranged outside an area surrounded by the first welding rib 21 on the bottom plate 2, and a protruding platform 27 for interacting with the wire slot 15 of the cover is arranged on the hanging lug 26. Two edges of the protruding platform 27 are configured to be arc protection edges 271, and a plurality of second waterproof ribs 272 aligned with the first waterproof ribs 151 are arranged on the surface of the protruding platform 27. Second welding ribs 261 are arranged on both sides of the protruding platform 27 on the hanging lug 26, and a top end of the second welding rib 261 is configured to be a conical structure. The hanging lug 26 is further provided with a mounting hole 28, and the lamp body may be mounted on a fixing member by screws through the mounting hole 28. Because the bottom plate 2 is provided with the blind hole 24, the magnetic block 25 and the mounting hole 28, there are various mounting ways such that a wider application range is achieved.

Referring again to FIGS. 1-2, a circuit is arranged on the circuit board 3, the LED light source 31 is installed in the center of the front surface of the circuit board 3, and two rows of binding posts 32 are arranged on the rear surface of the circuit board 3. The electric wire 4 is a flat shielded wire in interference fit with the wire slot 15, comprising a flat shield and a plurality of wires arranged in the shield. The electric wire 4 is connected to the binding post 32, and both sides of the shield of the electric wire 5 are configured to be rounded corners.

Figure 3:
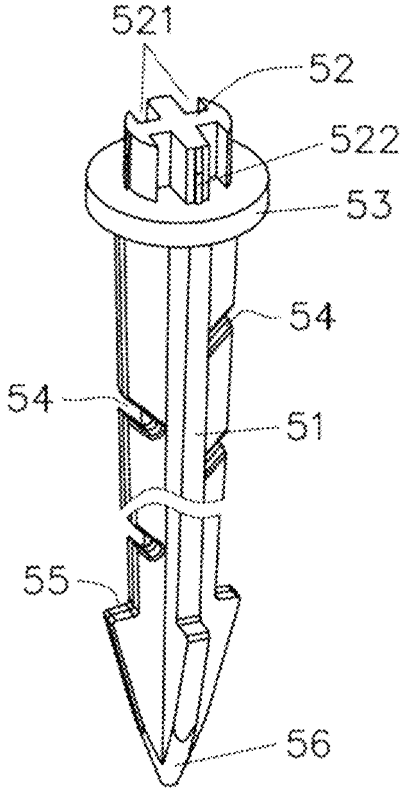
FIG. 3 is a schematic diagram illustrating the structure of the ground inserting portion.

Referring to FIG. 3, the ground inserting portion 5 comprises an inserting rod 51 having a cross-shaped cross section. An upper portion of the inserting rod 51 is provided with a connecting portion 52 in interference fit with the blind hole 24 in the bottom plate 2, and a lower portion of the connecting portion 52 is further provided with a limiting rib 53. The connecting portion 52 is provided with a plurality of grooves 521 extending along its axial direction and a mating rib 522 protruding out from a surface of the connecting portion 52. The groove 521 is capable of reducing the weight of the ground inserting portion 5 while improving the elasticity of the connecting portion 52, and the mating rib 522 is capable of improving the mating precision between the connecting portion 52 and the blind hole while reducing the manufacturing difficulty. When the connecting portion 52 is inserted into the blind hole 24 in the bottom plate of the lamp body, the limiting rib 53 abuts against the outside of the blind hole 24. A middle portion of the inserting rod 51 is provided with asymmetric anti-slip teeth 54, a lower portion of the inserting rod 51 is provided with a hook 55, and a tail portion of the inserting rod 51 is configured to be a tip 56. The anti-slip teeth 54 and the hook 55 increase the friction, thereby preventing the ground inserting portion 5 from being lifted due to the growth of plants. The asymmetric design of the anti-slip teeth 54 protects the strength of the inserting rod 51 from being excessively weakened.

Referring to FIGS. 2-5, the assembly process of the lamp body is as follows: first, the LED light source 31 and the electric wire 4 are mounted on the circuit board 3, the inner side of the cover 1 faces upwards, the LED light source 31 on the circuit board 3 is placed downwards into the cover 1, the circuit board 2 is guided onto the support ribs 14 of the cover 1 through the guide inclined surfaces 181 on the positioning ribs 18 of the cover 1, and the plurality of positioning ribs 14 abut against the periphery of the circuit board 3, so that the LED light source 31 is fixed at the center of the lens 13; subsequently, the electric wire 4 is clamped into the wire slot 15, the bottom plate 2 is assembled to the cover 1, and the outer side surface of the support plate 22 of the bottom plate 2 abuts against the inner side of the side wall 12 of the cover 1, so that the conical structure at the top end of the first welding rib 21 abuts against the bottom surface of the waterproof step 17 and the electric wire 4; the bottom end of the first welding rib 21 abuts against the side surface of the waterproof step 17, and the protruding platform 27 is clamped into the wire slot 15 to press the electric wire 4; finally, the first welding rib 21 and the waterproof step 17 are welded and fixed by using ultrasonic welding or other hot melting techniques, and the second welding rib 261 and the end surface of the side wall of the wire slot 15 are welded and fixed.

Figure 5:
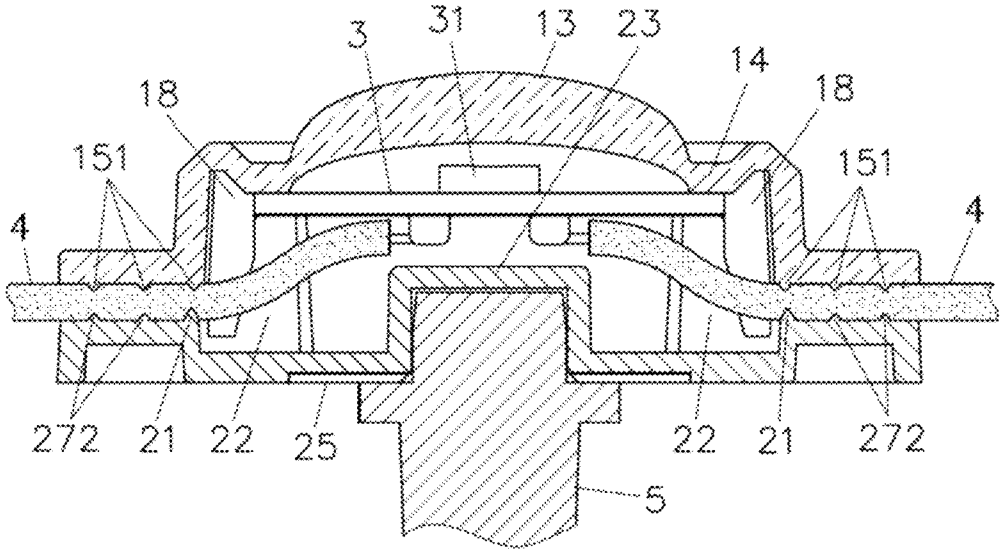
FIG. 5 is a schematic diagram illustrating a sectional view along line A-A in FIG. 4.
Figure 7:
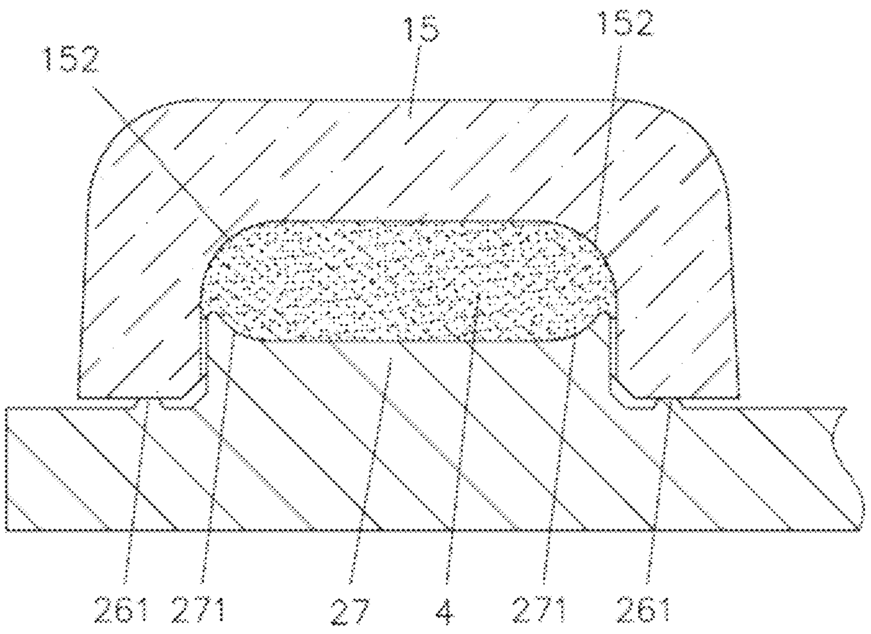
FIG. 7 is a schematic diagram illustrating a sectional view along line C-C in FIG. 4.

Referring to FIG. 5, the first welding rib 21 is arranged on the bottom plate 2 to press the electric wire 4, so that the local pressing force imposed on the electric wire 4 is increased. The first waterproof rib 151 on the innermost side of the wire slot 15 is aligned with the first welding rib 21, and the rest of first waterproof ribs 151 are aligned with the second waterproof ribs 21, thereby increasing the pressing force imposed on the electric wire 4 on a plurality of sections such that the waterproof effect is significantly improved. Referring to FIG. 7, the corners of the shield of the electric wire are rounded, the bottom wall and the side wall of the wire slot 15 are joined to form a rounded corner, and the two edges of the protruding platform 27 are arc protection edges, so that the shield of the electric wire 4 is fully attached to the wire slot 15 and the protruding platform 27. The two sides of the protruding platform 27 are provided with the second welding ribs 261, which are welded with the end surface of the side wall of the wire slot 15. In this way, the connection strength between the wire slot 15 and the protruding platform 27 is increased and the waterproof performance as well as durability of the electric wire is improved.

Figure 6:
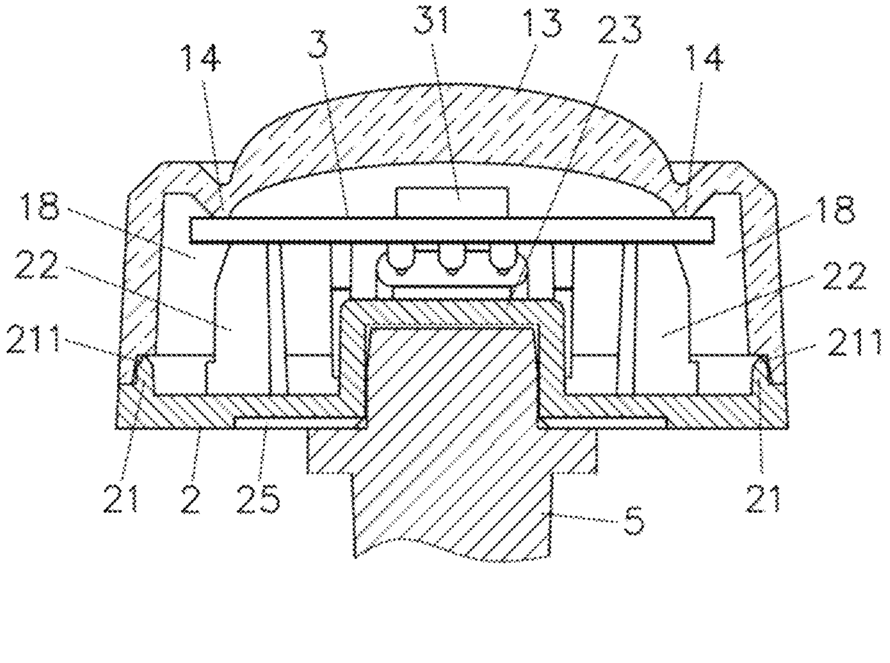
FIG. 6 is a schematic diagram illustrating a sectional view along line B-B in FIG. 4.

Referring to FIG. 6, as an improvement of the present invention, the waterproof step 17 is arranged on the bottom plate 2, and the first welding rib 21 is arranged on an end surface of the side wall 12 of the cover 1. As a further improvement of the present invention, the circuit board 3 may also be clamped between the support platform 23 of the bottom plate 2 and the support rib 14 of the cover. Thus, the support plate 22 is unnecessary and the structure of the bottom plate becomes simpler. Meanwhile, the heat of the circuit board 3 is dissipated through the blind hole outside the support platform 24, thereby achieving ideal heat dissipation effect. The circuit board 3 is arranged on the support plate 22 or the support platform 23 in the lamp body. In this way, even if a small amount of water enters the lamp body, the circuit board 3 is protected from being immersed in water, achieving better waterproof effect. In addition, the aforesaid structure also provides a larger heat dissipation space for the LED light source 31.

Figure 4:
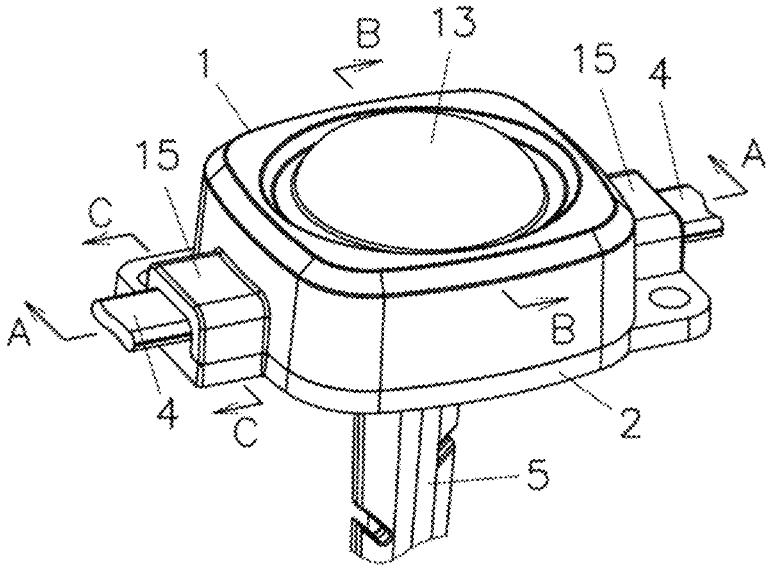
FIG. 4 is a schematic diagram illustrating the structure after the lamp body and the ground inserting portion is assembled.

Referring to FIGS. 3-5, to achieve high waterproof performance of the lamp body, the cover and the bottom plate are assembled, and the assembly surfaces of the cover and the bottom plate are provided with the first welding rib and the waterproof step that are capable of being welded together. By means of this design, high waterproof performance, simple structure, easy assembly, high production efficiency, low production cost and high durability are achieved. Moreover, to achieve high waterproof performance of the electric wire, the flat shielded wire and the wire slot in interference fit with the flat shielded wire are adopted, and the electric wire is fixed in the wire slot by using the bottom plate. Because the surface of the wire shield is flat, the structure of the wire slot is simple and high sealing performance is realized.

The above are merely preferred embodiments of the present invention. Although the description is specific and detailed, it cannot be understood as a limitation to the scope of the present invention. For those skilled in the art, modifications and improvements may be made without departing from the concept of the present invention, and all of which shall therefore fall within the scope defined by the claims of the present invention.

What is claimed is:

1. A decorative light string, comprising: a plurality of lamp bodies, and an electric wire connected to the plurality of lamp bodies, wherein the lamp body comprises: a cover, a bottom plate for sealing an opening of the cover, a circuit board mounted in the cover, and an LED light source mounted on the circuit board, wherein the electric wire is electrically connected to the circuit board and extends out from two sides of the cover, wherein the cover comprises a top wall and a side wall, wherein the top wall is provided with a lens integrally formed with the cover, wherein two sides of the side wall are provided with wire slots in interference fit with the electric wire, wherein a waterproof stepping portion and a first welded rib that are clamped to each other are arranged on a surface where an end surface of the side wall and the bottom plate are joined, wherein the first welded rib is welded and fixed to the waterproof step stepping portion, wherein the electric wire is a flat shielded wire, wherein the electric wire extends out from the wire slot, and wherein the bottom plate tightly presses the electric wire in the wire slot.

2. The decorative light string of claim 1, wherein the waterproof stepping portion is arranged on an end surface of the side wall of the cover, wherein the first welded rib is arranged on the bottom plate, and wherein the first welded rib is pressed on the electric wire.

3. The decorative light string of claim 2, wherein the bottom plate is provided with a protruding platform corresponding to the wire slot, and wherein the protruding platform is clamped into the wire slot and pressed on the electric wire.

4. The decorative light string of claim 3, wherein corners on both sides of the electric wire are configured to be rounded, wherein a bottom wall and a side wall of the wire slot are joined to form a rounded corner corresponding to the electric wire, and wherein two sides of the protruding platform are provided with arc protection edges corresponding to the electric wire.

5. The decorative light string of claim 4, wherein a plurality of first waterproof ribs extending from the bottom wall to the side wall of the wire slot are sequentially arranged in the wire slot from inside to outside, wherein the first waterproof rib on the innermost side is aligned with the first welded, wherein second waterproof ribs aligned with the rest of first waterproof ribs are arranged on the protruding platform, and wherein the first waterproof ribs and the second waterproof ribs are pressed on the electric wire.

6. The decorative light string of claim 5, wherein two sides of the protruding platform are provided with a second welded rib, and wherein the second welded rib is welded and fixed to the wire slot.

7. The decorative light string of claim 6, wherein the top ends of the first welded rib and the second welded rib are conical structures.

8. The decorative light string of claim 2, wherein the decorative light string further comprises a ground inserting portion, wherein the ground inserting portion comprises an inserting rod, wherein an upper portion of the inserting rod is provided with a connecting portion in interference fit with the blind hole in the bottom plate, and wherein the connecting portion is inserted into the blind hole.

9. The decorative light string of claim 8, wherein a limiting rib is arranged below the connecting portion, wherein the limiting rib abuts against the outside of the blind hole, wherein the connecting portion is provided with a plurality of grooves extending along its axial direction and a mating rib protruding out from a surface of the connecting portion, and wherein the mating rib is in interference fit with the blind hole.

10. The decorative light string of claim 9, wherein a middle portion of the inserting rod is provided with asymmetric anti-slip teeth, wherein a lower portion of the inserting rod is provided with a hook, and wherein a tail portion of the inserting rod is configured to be a tip.

11. The decorative light string of claim 1, wherein a plurality of support plates are erected on the bottom plate, wherein a support rib is arranged on an inner side of the cover, wherein the circuit board is clamped between the support plates and the support rib, and wherein an outer side surface of the support plate abuts against an inner side of the side wall of the cover, so that the waterproof stepping portion between the end surface of the side wall and the bottom plate is aligned with the first welded rib.

12. The decorative light string of claim 1, wherein a plurality of positioning ribs are arranged on the inner side of the side wall of the cover, wherein guide inclined surfaces are arranged on the end surfaces of the positioning ribs, and wherein the positioning ribs abut against a side surface of the circuit board, so that the light source on the circuit board is located in the center of the lens.

13. The decorative light string of claim 1, wherein a support rib is arranged on the inner side of the cover, wherein a support platform is arranged in the center of the inner side of the bottom plate, and wherein an outer side of the bottom plate is provided with an inwardly recessed blind hole corresponding to the support platform.

14. The decorative light string of claim 13, wherein the circuit board is clamped between the support plate and the support rib.

* * * * *